United States Patent
Rehman et al.

(10) Patent No.: US 7,332,023 B2
(45) Date of Patent: *Feb. 19, 2008

(54) DYE-BASED INK COMPOSITIONS

(75) Inventors: Zia Ur Rehman, Corvallis, OR (US);
Jules G. Moritz, Corvallis, OR (US);
Arun K. Agarwal, Corvallis, OR (US);
Hiang P. Lauw, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/073,442

(22) Filed: Mar. 7, 2005

(65) Prior Publication Data

US 2006/0196390 A1  Sep. 7, 2006

(51) Int. Cl.
*C09D 11/00* (2006.01)

(52) U.S. Cl. .................................. 106/31.58
(58) Field of Classification Search ............. 106/31.58, 106/31.86, 31.57, 31.85
See application file for complete search history.

(56) References Cited

U.S. PATENT DOCUMENTS

| | | | | |
|---|---|---|---|---|
| 5,356,464 A * | 10/1994 | Hickman et al. | ......... | 106/31.36 |
| 5,560,770 A * | 10/1996 | Yatake | ................... | 106/31.43 |
| 5,658,376 A * | 8/1997 | Noguchi et al. | ......... | 106/31.43 |
| 5,725,641 A * | 3/1998 | MacLeod | .................. | 106/31.5 |
| 5,810,917 A * | 9/1998 | Yamazaki et al. | ........ | 106/31.58 |
| 6,013,124 A * | 1/2000 | Saibara et al. | ........... | 106/31.86 |
| 6,019,828 A * | 2/2000 | Rehman | .................. | 106/31.58 |
| 6,187,086 B1* | 2/2001 | Rehman | .................. | 106/31.86 |
| 6,500,248 B1* | 12/2002 | Hayashi | .................. | 106/31.86 |
| 6,722,765 B2* | 4/2004 | Rolly et al. | ................. | 347/100 |
| 2003/0079647 A1* | 5/2003 | Kaneko et al. | .......... | 106/31.43 |
| 2005/0054751 A1* | 3/2005 | Namba et al. | .............. | 523/160 |
| 2005/0190244 A1* | 9/2005 | Tyrell | ........................ | 347/100 |

FOREIGN PATENT DOCUMENTS

| EP | 1138729 | 10/2001 |
|---|---|---|
| EP | 1473338 | 11/2004 |
| EP | 1262529 | 12/2004 |
| JP | 2003335987 A | 11/2003 |

OTHER PUBLICATIONS

Material Safety Data Sheet for 2-methyl-1,3-propanediol from Lyondell, Mar. 2002.*

EP Search Report, EP06110102 dated Mar. 26, 2007.

* cited by examiner

*Primary Examiner*—Helene Klemanski

(57) ABSTRACT

Disclosed is an ink composition that includes a colorant; a water-soluble organic solvent; and a penetrant, where the penetrant may be a hydroxylated pentane. Also disclosed is an ink composition that includes a penetrant that enables the ink composition to maintain a drop weight of at least about 4.5 ng at high operating frequencies of an ink drop generator of the ink-jet printer.

15 Claims, 1 Drawing Sheet

DYE-BASED INK COMPOSITIONS

BACKGROUND

The combination of low cost and high quality output have recently made ink-jet printers a popular alternative to other types of non-impact printers such as laser printers.

The ink-jet printing process involves the ejection of fine droplets of ink onto a print medium such as paper in response to electrical signals generated by a microprocessor. Typically, an ink-jet printer utilizes a pen set mounted on a carriage that is moved relative to the surface of a print medium. In commercially available ink-jet color printers, such as the DESKJET™ printer available from Hewlett-Packard Company, a four-pen set including cyan, yellow, magenta and black inks is generally employed to achieve the necessary color combinations.

A typical pen includes print heads with orifice plates that have very small nozzles (typically 10-50 μm diameter) through which the ink droplets are ejected. Adjacent these nozzles are ink chambers where ink is stored prior to ejection. U.S. Pat. No. 5,181,045 (incorporated by reference herein) discloses a typical channel between the ink chamber and the nozzle.

Ink drop ejection is currently achieved either thermally or piezoelectrically. In thermal ink-jet printing, each nozzle is associated with a resistor element. Each resistor element is in turn connected to a microprocessor, signals from which direct one or more resistor elements to heat up rapidly. The heating of the resistor elements causes a rapid expansion of ink vapor that forces a drop of ink through the associated nozzle onto the print medium. In piezoelectric ink-jet printing, ink droplets are ejected due to the vibrations of piezoelectric crystals stimulated by electrical signals generated by the microprocessor.

Interactions between the ink and pen architecture (e.g., the resistor element, nozzle, etc.) strongly influence the reliability of pen performance. In addition, interactions between the ink and both the surface and bulk of the print medium play a key role in determining print quality. A significant amount of research has recently been conducted to produce improved ink compositions for ink-jet printers that exhibit favorable interactions with both the pen architecture and the print medium.

There are many demanding performance requirements for colorants and inks used in ink-jet printing. For example, they desirably provide sharp, non-feathered images having good water-fastness, light-fastness and optical density. Optical density is the degree of darkness and/or spectral reflectance of printed colors.

There is a need for inks which are suitable for both thermal and piezo ink-jet printers, have high color strength, and produce images having a high light-fastness and water-fastness when printed on a substrate. There have been many attempts by industry to produce fast drying inks with good bleed control. When surfactants are used for the purpose of dry-time improvement, one often sees a concomitant bleed control improvement, however, often at the expense of print quality—more specifically, edge acuity. Additionally, the use of surfactants in the ink compositions can lead to optical density losses. Thus, a need still remains for ink compositions for use in ink-jet printing which have faster dry time as well as maintaining other desirable properties of such inks, such as waterfastness, bleed control, and halo control.

SUMMARY

Briefly described, embodiments of this disclosure include ink compositions for use in ink-jet printer systems. One exemplary ink composition, among others, includes a colorant, a water-soluble organic solvent, and a penetrant wherein the penetrant is a hydroxylated pentane. Another exemplary ink composition includes a colorant; a water-soluble organic solvent; and a penetrant that enables the ink composition to maintain a drop weight of at least about 4.5 ng at high operating frequencies of an ink drop generator of the ink-jet printer.

BRIEF DESCRIPTION OF THE DRAWINGS

Aspects of the disclosed ink compositions can be better understood with reference to the following drawing. The drawing is not necessarily to scale.

DETAILED DESCRIPTION

Figure 1:
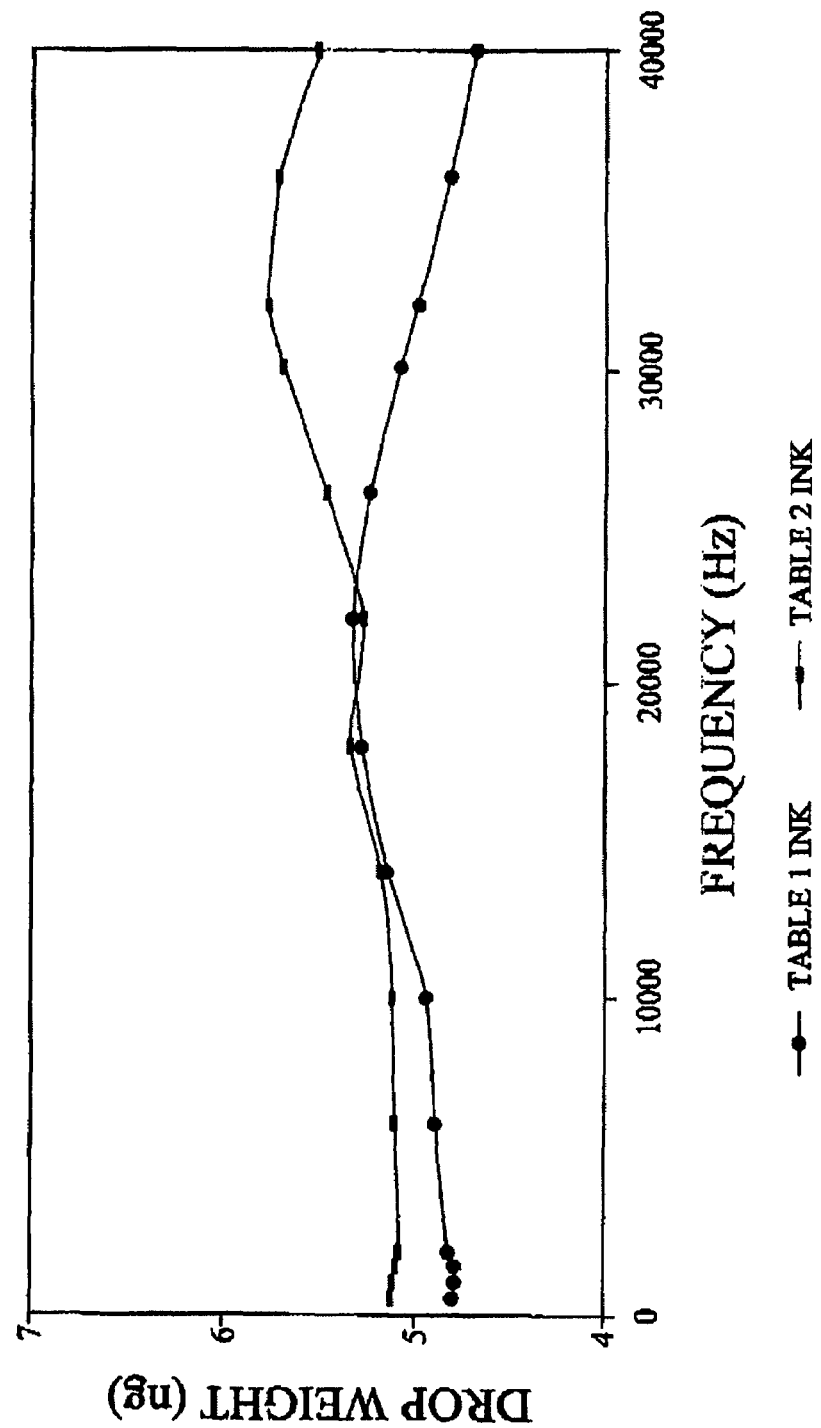
FIG. 1 illustrates results of a drop weight vs. frequency test performed on embodiments of the disclosed ink compositions.

Ink compositions are provided. In particular, the embodiments relate to the use of ink compositions in ink-jet printers at high frequencies. Embodiments also relate to use of the ink compositions in ink-jet printers at high frequencies and with very little drift in drop weight of the ink compositions. Embodiments of the ink-jet ink compositions will now be described in detail with particular reference to aqueous ink-jet ink compositions and the materials therein.

A. Low Ink Drop Weight

High-resolution print (such as photographic-quality resolution) can be achieved in part by having ink drop generators in an ink-jet printhead eject ink drops having a low drop weight. A low-weight ink drop is smaller and provides a finer resolution print than is achieved with higher-weight ink drops.

In a working example of the disclosed ink compositions, each ink drop weighs at least about 4.5 nanograms (ng). In another embodiment, the ink drop weighs from about 4.8-5.3 ng.

B. High Operating Frequency

In general, the ink drop generators operate at a high operating frequency in order to maintain an acceptable print speed while using low weight ink drops. Preferably, this operating frequency is in the kilohertz (KHz) range. This high operating frequency combined with the high-density array of drop generators provides improved print speed at high resolution.

In a working example, ink drop generators have been operated at frequencies ranging from 2.25 to 60 KHz. In particular, it is desirable to have ink drop generators operate at frequencies ranging from about 35 to 60 KHz. Ink drop generators can operated at 40 KHz in printing with an ink drop weight of at least approximately 4.5 ng using an embodiment of the disclosed ink compositions.

C. Ink Compositions

Exemplary embodiments of the ink compositions comprise, by weight (all percents are by weight and are approximate, unless otherwise indicated) from about 0.01 to 50%, or from about 5 to 25% organic solvents; from about 0 to 40%, or from about 0.1 to 7% surfactants; from about 0.01 to 5%, or from about 0.01 to 2% penetrant(s); and from about 0.5 to 10% colorant. The remainder of the ink compositions are mostly water; however, other components such as biocides that inhibit growth of microorganisms; chelating agents such as EDTA that eliminate deleterious effects of heavy metal impurities; buffers; viscosity modifiers; and/or acrylic and non-acrylic polymers can be added to improve various properties of the ink composition.

In one embodiment, the ink composition comprises, by weight, about 18% organic solvents, about 6% surfactants, about 0.01 to 2% penetrant, and about 4% colorant.

The disclosed ink compositions desirably have certain physical characteristics that enable the drop weight to be maintained at an acceptable level, even at high operating frequencies (e.g., greater than 18 KHz). For example, the ink composition can have an electrical conductivity from about 4 mS/cm to 10 mS/cm, or from about 6 mS/cm to 7 mS/cm. In one embodiment, the ink composition has a pH from about 6 to 9.5, or from about 7.5 to 8.5. The disclosed ink composition can have a surface tension from about 40 dynes/cm to 60 dynes/cm, or from about 45 dynes/cm to 55 dynes/cm. It is desirable that the ink composition have a viscosity from about 1 cP to 4 cP, or from about 1.5 cP to 2.5 cP.

D. Ink Composition Materials

1. Organic Solvents

One or more organic solvents can be used to prepare the disclosed ink compositions. In one embodiment, the organic solvents are water-soluble. Exemplary water-soluble organic solvents suitable for this purpose include, for example, aliphatic alcohols, aromatic alcohols, diols, triols, amides, ketones, polyketones or ketoalcohols, nitrogen-containing heterocyclic ketones, ethers, glycol ethers, poly(glycol) ethers, alkylene glycols, polyalkylene glycols, thioglycols containing alkylene groups, lower alkyl ethers of polyhydric alcohols, and lactams. The concentration of the organic solvents can range from 0.01 to 50 wt %, or from 5 to 25wt %.

2. Surfactants

One or more water soluble surfactants can be employed in the formulation of a vehicle for the ink. For convenience, examples of surfactants are divided into two categories: (1) non-ionic and amphoteric and (2) ionic. The former class includes the alkyl polyethylene oxides (PEOs); alkyl phenyl PEOs; ethylene oxide/propylene oxide block copolymers; acetylenic PEOs; PEO esters; PEO diesters; PEO amines; PEO amides; and dimethicone copolyols. U.S. Pat. No. 5,106,416 (which is hereby incorporated by reference herein) discusses many of the surfactants listed above in greater detail. Amphoteric surfactants such as substituted amine oxides or members of the octyl dimethyl glycine family of octylamine choloroacetic adducts are also useful in the disclosed ink compositions. Cationic surfactants such as protonated PEO amines, and anionic surfactants such as diphenyl sulfonate derivatives like, for example, sodium hexadecyl diphenyloxide disulfonate, and ethoxylated oleoalcohol phosphate esters can also be used.

Non-ionic/amphoteric surfactants are sometimes desired over the ionic surfactants. Specific examples of surfactants that are preferably employed in the disclosed ink compositions include secondary alcohol ethoxylate, SURFYNOL™ CT-11, octyl dimethyl glycine, sodium hexadecyl diphenyloxide disulfonate, oleyl triethoxy mono diphosphate, iso-hexadecyl ethylene oxide 20 (available from the ICI Group as ARLASOLVE™ 200), and/or amine oxides such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octadecenyl)-N-amine oxide. The disclosed ink composition comprises by weight from about 0 to 40%, or from 0.1 to 7%, surfactants.

3. Penetrant

In addition to the surfactant, or in place of the surfactant, a penetrant can be included in the disclosed ink compositions. The penetrant is used to improve the wetting properties for a recording medium in order to accelerate ink penetration. The penetrant can also be used in the disclosed ink compositions to maintain the ink drop weight within acceptable parameters, even at high operating frequencies of the ink drop generator. In one embodiment, the ink composition includes a penetrant that enables the drop weight to be maintained at greater than or equal to about 4.5 ng at frequencies of about 40 KHz.

Water-soluble organic solvents and surface active agents can be used as a penetrant. In particular, the penetrant can be a low molecular weight polyol. More specifically, the penetrant can be a hydroxylated pentane. The penetrant can also be a substituted hydroxylated pentane. The substitutions on the hydroxylated pentane can be, for example, an alkyl group. The alkyl group can be, for example, a methyl group.

The hydroxylated pentane can be either, for example, a pentanediol or a pentanetriol. The pentanediol can be, for example, a 1,3-pentanediol or a 1,5-pentanediol. The pentanetriol can be, for example, a 1,3,5,-pentanetriol. Specifically, the penetrant can be, for example, 3-methyl-1,5-pentanediol; 2-methyl-1,3-pentanediol; 1,5-pentanediol; or 3-methyl-1,3,5-pentanetriol.

In one embodiment, the disclosed ink composition comprises by weight from about 0.01 to 5% penetrant. In another embodiment, the disclosed ink composition comprises by weight from about 0.01 to 2% penetrant.

4. Colorants

Suitable colorants for the disclosed ink compositions include but are not limited to aqueous dyes such as Direct Blue 86, Direct Blue 199, Direct Yellow 132, Acid Yellow 132, Direct Red 9, Direct Red 32, Acid Yellow 23, Acid Blue 185, Acid Blue 9, Acid Blue 15, Acid Blue 25, Acid Blue 40, Acid Blue 92, Acid Blue 104, Acid Blue 113, Acid Blue 158, Acid Blue 193, Basic Blue 3, Direct Blue 86, Direct Blue 199, Reactive Blue 49, Reactive Blue 25, Solvent Blue 36. Acid Yellow 17, Acid Yellow 23, Acid Yellow 36, Acid Yellow 42, Acid Yellow 99, Acid Yellow 110, Acid Yellow 114, Acid Yellow 151, Direct Yellow 86, Direct Yellow 132, Reactive Yellow 37, Solvent Yellow 21. Acid Red 1, Acid Red 14, Acid Red 18, Acid Red 35, Acid Red 73, Acid Red 85, Acid Red 88, Acid Red 97, Acid Red 106, Acid Red 119, Acid Red 131, Acid Red 151, Acid Red 27, Acid Red 17, Acid Red 52, Acid Red 249, Acid Red 289, Basic Red 1, Direct Red 227, Reactive Red 180, Reactive Red 31, Reactive Red, and Reactive Red 120.

In addition, suitable colorants for the disclosed ink compositions may include but are not limited to black colorants, and more specifically, towards the black dyes. The black colorant can be a dye and/or a pigment colorant. In one embodiment, the black colorant can be a dye including but not limited to pacified Reactive Black 31, Direct Black 168, Acid Black 52, Direct Black 170, Acid Black 1, Acid Black 2, Acid Black 11, Acid Black 17, Acid Black 58, Acid Black 64, Acid Black 194, Acid Black 210, Acid Black 234, Direct Black 22, Direct Black 19, Direct Black IJ Dye, Direct Black 168, Reactive Black 8, Solvent Black 13, Food Black 2, Black 1334 and Black 820 by Avecia Colours Ltd. of Manchester, UK. An embodiment of the disclosed ink compositions may comprise by weight from about 0.5 to 10% dye.

EXAMPLE

In order to further illustrate the disclosed ink compositions, some exemplary compositions are set forth below. Ink-jet ink compositions were prepared as shown in Tables 1 and 2 (all values are approximate weight percentages):

TABLE 1

| Component | Component Type | Weight % of Component |
| --- | --- | --- |
| 3-methyl-1,5-pentanediol | penetrant | 0.5 |
| 1-(2-hyroxyethyl)-2-pyrrolidone | Solvent | 8 |
| 2-pyrrolidone | Solvent | 8 |
| EDTA free acid | chelating agent | 0.1 |
| Trizma Base | buffer | 0.2 |
| Proxel GXL ™ [NA] | biocide | 0.1 |

TABLE 2

| Component | Component Type | Weight % of Component |
| --- | --- | --- |
| Ethoxylated Glycerol | Humectant | 4.3 |
| 3-methyl-1,5-pentanediol | penetrant | 0.5 |
| 2,5-dimethyl-3-hexyne-2,5-diol | Solvent | 1 |
| 1-(2-hyroxyethyl)-2-pyrrolidone | Solvent | 8 |
| 2-pyrrolidone | Solvent | 8 |
| EDTA free acid | chelating agent | 0.1 |
| Trizma Base | buffer | 0.2 |
| Proxel GXL ™ [NA] | biocide | 0.1 |

A drop weight vs. frequency test was performed using the ink-jet ink compositions of Table 1 and Table 2. The results obtained are depicted in FIG. 1. The results shown in FIG. 1 indicate that the change ($\Delta$) in drop weight is acceptable for the embodiments of the ink composition disclosed in Tables 1 and 2.

Many variations and modifications can be made to the above-described embodiments. All such modifications and variations are intended to be included herein within the scope of this disclosure and protected by the following claims.

At least the following is claimed:

1. An ink composition, comprising:
    a direct dye;
    a water-soluble organic solvent; and
    a penetrant, wherein the penetrant is chosen from 3-methyl-1,5-pentanediol; 2-methyl-1,3-pentanediol; or 3-methyl-1,3,5-pentanetriol.

2. The composition of claim 1, wherein the penetrant comprises about 0.01-5% by weight of the ink composition.

3. The composition of claim 1, wherein the penetrant comprises about 0.01-2% by weight of the ink composition.

4. An ink composition for use in an ink-jet printer, comprising:
    a direct dye;
    a water-soluble organic solvent; and
    a penetrant that enables the ink composition to maintain a drop weight of at least about 4.5 ng at high operating frequencies of an ink drop generator of the ink-jet printer,
    wherein the penetrant is chosen from 3-methyl-1,5-pentanediol; 2-methyl-1,3-pentanediol; or 3-methyl-1,3,5-pentanetriol.

5. The composition of claim 4, wherein the penetrant enables the ink composition to maintain a drop weight of about 4.8 ng to 5.3 ng at high operating frequencies of a printhead of the ink-jet printer.

6. The composition of claim 4, wherein the ink composition has an electrical conductivity from about 4 mS/cm to 10 mS/cm.

7. The composition of claim 4, wherein the ink composition has an electrical conductivity from about 6 mS/cm to 7 mS/cm.

8. The composition of claim 4, wherein the ink composition has a pH from about 6 to 9.5.

9. The composition of claim 4, wherein the ink composition has a pH from about 7.5 to 6.5.

10. The composition of claim 4, wherein the ink composition has a surface tension from about 40 dynes/cm to 60 dynes/cm.

11. The composition of claim 4, wherein the ink composition has a surface tension from about 45 dynes/cm to 55 dynes/cm.

12. The composition of claim 4, wherein the ink composition has a viscosity from about 1 cP to 4 cP.

13. The composition of claim 4, wherein the ink composition has a viscosity from about 1.5 cP to 2.5 cP.

14. The composition of claim 4, wherein the penetrant is 3-methyl-1,5-pentanediol, and wherein the ink composition:
    maintains a drop weight of about 4.8 ng to 5.3 ng at high operating frequencies of the ink drop generator of greater than 18 KHz;
    has a conductivity from about 6 mS/cm to 7 mS/cm;
    has a pH from about 7.6 to 8.5;
    has a surface tension from about 45 dynes/cm to 55 dynes/cm: and
    has a viscosity from about 1.5 cP to 2.5 cP.

15. The composition of claim 4, wherein the operating frequency of the ink drop generator is from about 35-60 KHz.

* * * * *

UNITED STATES PATENT AND TRADEMARK OFFICE
CERTIFICATE OF CORRECTION

PATENT NO. : 7,332,023 B2  Page 1 of 1
APPLICATION NO. : 11/073442
DATED : February 19, 2008
INVENTOR(S) : Zia Ur Rehman et al.

It is certified that error appears in the above-identified patent and that said Letters Patent is hereby corrected as shown below:

In column 6, line 26, in Claim 9, delete "6.5" and insert -- 8.5 --, therefor.

In column 6, line 46, in Claim 14, delete "7.6" and insert -- 7.5 --, therefor.

In column 6, line 48, in Claim 14, after "dynes/cm" delete ":" and insert -- ; --, therefor.

Signed and Sealed this

Second Day of September, 2008

JON W. DUDAS
*Director of the United States Patent and Trademark Office*